United States Patent [19]

Airhart

[11] Patent Number: 4,804,062

[45] Date of Patent: Feb. 14, 1989

[54] BASEPLATE ASSEMBLY FOR SEISMIC WAVE GENERATOR

[75] Inventor: Tom P. Airhart, Plano, Tex.

[73] Assignee: Atlantic Refining Company, Los Angeles, Calif.

[21] Appl. No.: 20,415

[22] Filed: Mar. 2, 1987

[51] Int. Cl.⁴ ............................................. G01V 1/04
[52] U.S. Cl. ..................................... 181/121; 181/401
[58] Field of Search ............. 181/113, 114, 116, 117, 181/119, 120, 121, 401; 367/143, 189, 190; 73/662, 663, 666; 173/22

[56] References Cited

U.S. PATENT DOCUMENTS

| | | | |
|---|---|---|---|
| 2,620,766 | 12/1952 | Seavey | 181/401 X |
| 3,106,982 | 10/1963 | Wade | 181/114 X |
| 4,056,164 | 11/1977 | Johnston | 181/114 |
| 4,284,164 | 8/1981 | Airhart | 181/117 |
| 4,284,165 | 8/1981 | Airhart et al. | 181/119 |
| 4,402,381 | 9/1983 | Airhart | 181/121 |
| 4,418,786 | 12/1983 | Martin | 181/401 |
| 4,484,657 | 11/1984 | Barta | 181/114 |
| 4,506,758 | 3/1985 | Fair | 367/189 X |
| 4,721,181 | 1/1988 | Airhart et al. | 181/114 |

*Primary Examiner*—Brian S. Steinberger
*Attorney, Agent, or Firm*—Robert M. Betz; F. Lindsey Scott

[57] ABSTRACT

A baseplate assembly for an impulsive, vehicle-transported seismic wave generator for use on rocky, irregular earth surfaces is comprised of a small diameter, earth-contacting, freely movable target member which is laterally confined in the center of a surrounding wide area frame adapted to support vehicle weight directly against the earth. Such a target member may safely be subjected to high dynamic loading per unit area responsive to the impact of a descending mass.

3 Claims, 3 Drawing Sheets

BASEPLATE ASSEMBLY FOR SEISMIC WAVE GENERATOR

BACKGROUND OF THE INVENTION

1. Field of the Invention

This invention relates generally to the field of seismic exploration and more particularly to transportable apparatus for injecting an acoustic pulse into the earth.

2. Description of the Prior Art

The invention to be described constitutes an improvement in transportable seismic sources of the type generally disclosed and illustrated in U.S. Pat. No. 4,402,381 entitled "Vehicle Mounting and Deployment Arrangement for Seismic Source," issued Sept. 6, 1983, the contents of which are hereby incorporated by reference, and in copending commonly assigned U.S. patent application Ser. No. 06/846,393 entitled "Baseplate Locator for Seismic Source," filed Mar. 31, 1986 in the name of Tom P. Airhart and Andrew B. Woodrow. As described in U.S. Pat. No. 4,402,381, an impact mass suspended within the generally upright, open bottom cylindrical firing tube of a vehicle-mounted actuator is propelled downwardly under gas pressure to impact a wide area baseplate positionable on the surface of the earth in alignment with the bore of the tube. The baseplate couples the kinetic energy of the moving mass into the earth to generate a seismic wave of acoustic frequency. According to the patent, when the baseplate is deployed at a particular location, its alignment is maintained by various means including, among other features, a plurality of vertical lift cylinders operated like jacks extending upwardly between the upper baseplate surface and the actuator. The weight of the vehicle and associated apparatus carried thereon keeps the baseplate from shifting position under repeated heavy blows from the impact mass. The above-referenced patent application concerns an improvement in the baseplate alignment means taught in U.S. Pat. No. 4,402,381 in order to achieve superior results on uneven terrain. According to such application, lift means such as previously described in the -381 patent are provided together with elastic shock isolators through which vertical forces are transmitted between the vehicle chassis and the baseplate. These isolators not only cushion the system against vertically-directed shocks but, also, provide restorative forces in the event lateral misalignment develops between the vehicle and the baseplate.

A baseplate such as described above is designed to function best when positioned on relatively soft, and thus somewhat compressible, ground or soil. Under the weight of the transport vehicle, such a baseplate tends to smooth out surface irregularities and thus establish good overall contact between the baseplate surface and the underlying earth medium. A large surface baseplate is generally preferred under these conditions because it lowers the loading per unit area under impact. This in turn makes it possible to deliver more energy to the baseplate without increasing inefficient plastic deformation of the earth to an undesirable degree. However, field tests of this type of source indicate that when a seismic line includes surfaces consisting at least intermittently of hard rock, either exposed or only lightly covered by clumps of vegetation, a large area baseplate encounters problems. One reason appears to be that upon deployment from the transport vehicle, the baseplate "bridges over" irregularities in the rock surface which are substantially immune to smoothing even under great weight. This concentrates stress unevenly over the baseplate surface, leading to strain and cracking under repeated blows. It also makes it more difficult in such environment to generate seismic waves of reliable and repeatable energy content, thus interfering with the data quality obtainable and complicating the task of seismic interpretation.

SUMMARY OF THE INVENTION

It is therefor a general object of the present invention to provide an impulsive seismic wave generator with improved means for conducting operations on irregular, relatively incompressible surfaces such as rock formations.

It is a more particular object of this invention to provide improved means for coupling the energy of such a seismic wave generator into an earth medium of the type referenced above.

These and further objects and advantages of this invention will become apparent from a consideration of the detailed description and drawings to follow and the appended claims.

In accordance with the preferred embodiment of this invention, a vehicle-transported apparatus produces seismic waves in an earth medium by propelling a retractable mass along a downward path to strike a target member slidably interconnected with alignment means so as to permit limited travel of such target member along such path against the earth responsive to the impact of such mass. Extensible lift means are secured between the vehicle and the alignment means for raising and lowering the alignment means, the relative arrangement of said alignment means and said target member being such that by extension of such lift means said alignment means and said target member may both be positioned in contact with the surface of said earth medium. In a more limited aspect, said alignment means is a supporting frame extending generally in a plane transverse to the direction of said path, said frame being provided with an aperture aligned with said path and adapted to receive said target member therein. Elastic means interconnecting the target member and the frame support the target member within the aperture and restore the target member to the same position therein after each mass impact. In a still more limited embodiment, said lift means consists of hydraulic cylinders which may be operated so as to transfer vehicle weight to said frame and said target member in proportion depending upon such relative arrangement.

DETAILED DESCRIPTION OF THE PREFERRED EMBODIMENTS

Figure 1:
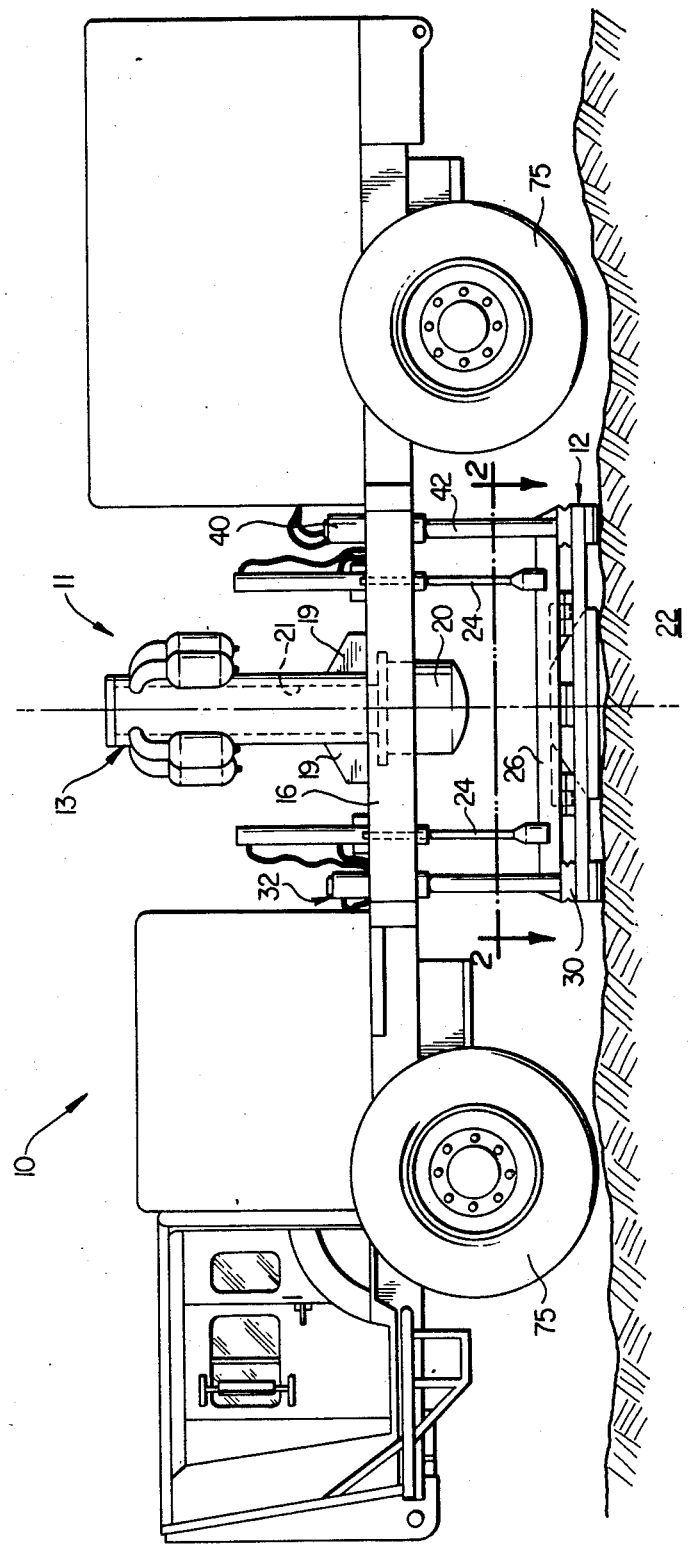
FIG. 1 is a simplified elevational view of a vehicle-transported seismic wave generator utilizing a baseplate assembly in accordance with the preferred embodiment of this invention.

With reference now to FIG. 1, there is illustrated a transport vehicle 10 carrying a seismic wave generator apparatus 11 incorporating a baseplate assembly 12 in accordance with a preferred embodiment of the invention. The apparatus 11 comprises generally an actuator 13 securely joined to vehicle chassis 16 by any suitable means such as support members 19. Preparatory to a firing operation, an elongated cylindrical impact mass 20 is suspended within firing tube 21 of actuator 13 several feet above baseplate assembly 12 as deployed on an earth surface 22. Details of conventional means for firing mass 20 and for returning it to its firing position are omitted in order to simplify the description and drawings, and as such, these details form no part of this invention. Such means are disclosed in detail, however, in U.S. Pat. No. 4,284,165 entitled "Acoustic Pulse Generator" issued to Tom P. Airhart et al Aug. 18, 1981 and in other related patents.

Figure 2:
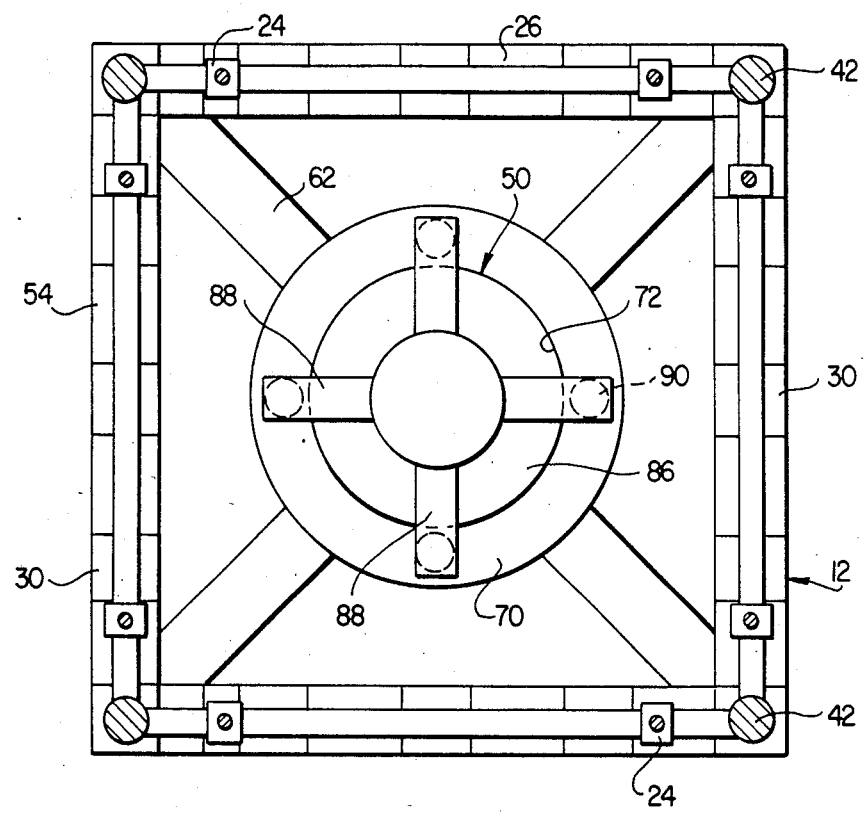
FIG. 2 is a top plan view of the apparatus of this invention taken along the line 2—2 in FIG. 1.

With additional reference to FIG. 2, a rectangular array of extensible lift means 24 such as hydraulic cylinders, may be interconnected between chassis 16 and a generally horizontally disposed rectangular lift frame 26 positioned directly over and generally coextensive with baseplate assembly 12. Lift frame 26 is spaced from and joined to baseplate assembly 12 by means of a plurality of shock absorbent members 30 to be described below in more detail. Upstanding sleeve guides 32 extending adjacent and parallel to lift means 24 provide lateral stability for apparatus 11. Each guide 32 consists of an outer sleeve 40 secured to chassis 16 and adapted to slideably receive therein a guide shaft 42, the lower ends of shafts 42 being suitably anchored to lift frame 26. In this way, guide shafts 42 are constrained to move up and down integrally with lift means 24 as baseplate assembly 12 is either deployed downwardly for a firing operation or retrieved for transport.

Figure 3:
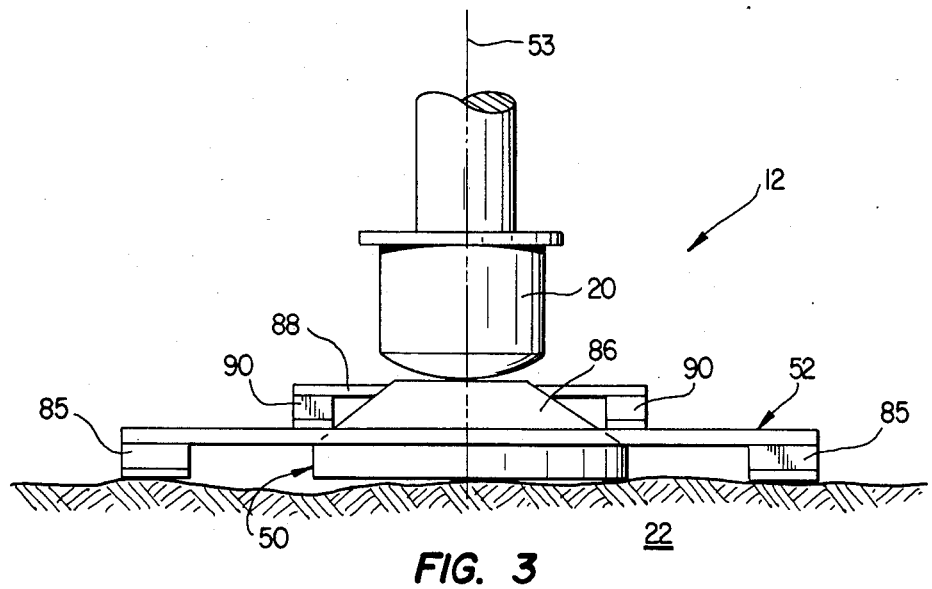
FIG. 3 is an elevational view of the baseplate assembly of FIG. 1 illustrating schematically an impact mass delivered by the generator at the point of contact with a central target member.
Figure 4:
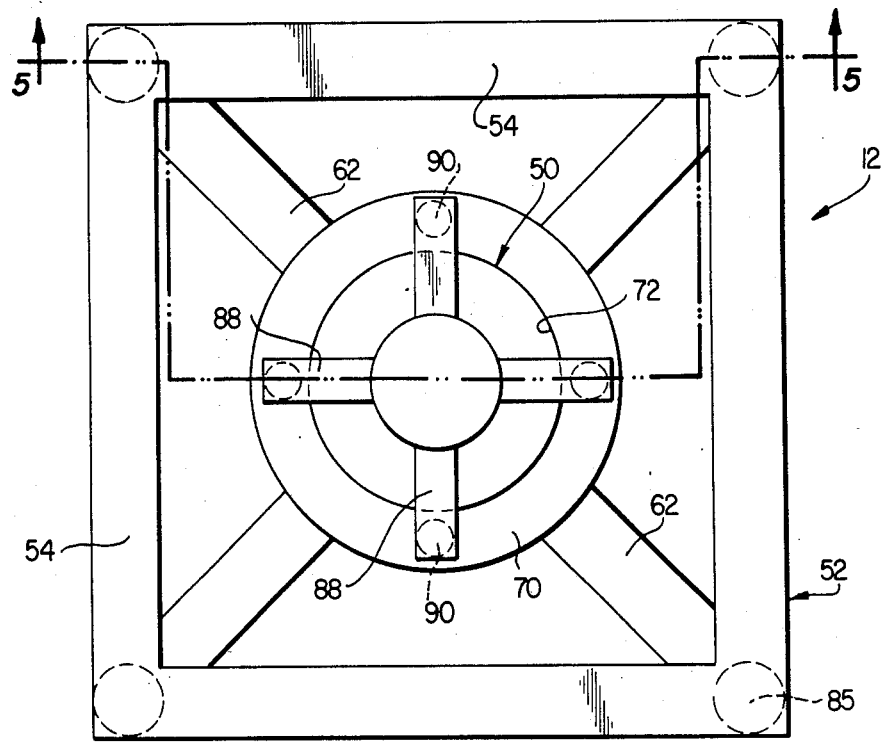
FIG. 4 is a top plan view of the baseplate assembly of FIG. 1.

With additional reference to FIGS. 3 and 4, baseplate assembly 12 is seen to comprise generally a central target member 50 confined within a surrounding alignment frame 52 disposed in a plane transverse to the path of travel 53 of mass 20. Frame 52 may conveniently be formed of a rectangular array of horizontal rails 54 from which diagonal supports 62 converge to a hollow, central, cylindrical hub 70 forming an aperture 72 adapted to slideably receive target member 50. Frame 52 is positioned so that target member 50 is correctly aligned with path of travel 53 and is free to directly contact the earth surface 22.

After baseplate assembly 12 is initially lowered to contact earth surface 22 by extension of lift means 24, further extension compresses shock absorbent members 30 and brings the weight of the transport vehicle 10, including apparatus 11, to bear, at least in part, on frame 52. In this way, lift means 24 function as jacks which either partially or entirely eliminate vehicle wheels 75 as load bearing members, local conditions determining the preferred arrangement. As will become apparent, baseplate assembly 12 is so designed that target member 50 also makes direct contact with earth surface 22 but may experience little or no initial static loading due to vehicle weight. Members 30, preferably capable of exhibiting three dimensional elasticity, are secured to the under surface of lift frame 26 at spaced intervals so as to transmit vertical force evenly to frame 52. They also resiliently resist lateral misaligning movement of chassis 16 and apparatus 11 with respect to frame 52. Within the scope of this invention, it may be desirable to make lift frame 26 separate from frame 52 while remaining loosely coupled thereto. In that event, slidably interactive means may be provided for guiding members 30 to precise locations on the upper surface of frame 52 under load. For simplicity, such means are not shown or described herein because they are not essential to an understanding of this invention. They are described, however, in detail and claimed in copending, commonly assigned U.S. patent application Ser. No. 06/846,393 now U.S. Pat. No. 4,721,181, entitled "Baseplate Locator for Seismic Source", referenced above in this description.

Resilient pads 85, as for example, coiled springs or other similar elastic media, attached to the under surfaces of rails 54 such as at their corners are adapted to make contact with earth surface 22. In this way, frame 52 becomes a highly stable, self-adjusting support for positioning and guidance of target member 50 but does not interfere with its free movement. Furthermore, this construction permits a reduced cross-sectional area for target member 50 relative to that of frame 52, thus increasing the dynamic loading on target member 50 per unit area for an impact of any given magnitude. At the same time, target member 50 may easily be made thicker for greater strength. It is also clear now that within the scope of this invention, frame 52 may be given a wide variety of different structural forms extending laterally between peripheral pads 85 and the position of aperture 72, depending upon considerations such as space, weight, and vehicle under carriage conformation.

Figure 5:
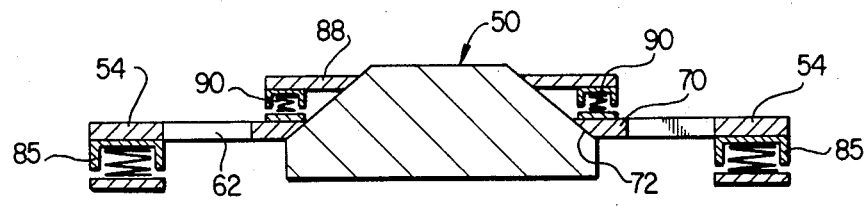
FIG. 5 is a simplified sectional view taken along line 5—5 in FIG. 4.

Owing to the presumed irregularity of a hard rock earth surface 22, it is desirable to permit target member 50 some degree of lateral and rotational freedom of movement. To this end, as shown in FIG. 5, aperture 72 may be formed as an upwardly tapered cone shaped cavity and the tapered external surface 86 of target member 50 may be given a corresponding shape. This enables target member 50 to shift position rotationally within aperture 72. Also, because of its cone shaped interface with hub 70, a downward shift of target member 50 relative to frame 52 permits it to assume a slight sidewise tilt. Both of these types of motion enable target member 50 to better follow and make firm contact with an irregular rocky surface 22. This in turn improves the efficiency of energy coupling and improves the band width of the resultant seismic wave.

With further reference to FIG. 5, target member 50 is also provided with means such as a plurality of radially extending arms 88 which lie above and are connected to hub 70 through elastic supports such as relatively low spring constant compression springs 90 extending parallel to path 53. In this way, target member 50 is substantially free to move downwardly against the earth surface 22 in operation but is firmly restored and seated against frame 52 with correct orientation after each shot. Spring supports 90 also serve as a convenient means for picking up baseplate 50 together with frame 52 when apparatus 11 is moved from one location to another. If the spring constant of springs 90 is made significantly lower than that of the earth itself at the point of contact, no appreciable energy will be transferred secondarily to the earth through frame 52 and pads 85 in the frequency range of interest so as to contaminate the primary seismic pulse.

When frame 52 is statically loaded by vehicle 10, target member should be arranged so that it projects at least to the bottom of aperture 72 and makes contact with earth surface 22. A portion of target member 50 preferably projects beneath the bottom of aperture 72 to a distance somewhat less in height than the unstressed height of pads 85. In this way, the weight of the vehicle may be substantially absorbed in pads 85 under load so that target member 50 sees a relatively small or no initial static load. This in turn may facilitate the ability of target member 50 to make good contact with irregular rock surfaces when impacted.

Figure 6:
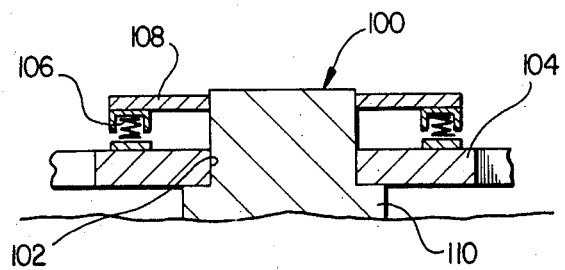
FIG. 6 is a simplified fragmentary sectional view of a baseplate assembly in accordance with an alternate embodiment of this invention.

In FIG. 6, an alternate form of the invention illustrates detail of target member 100 having a right cylindrical profile working slideably within a correspondingly shaped aperture 102 centrally located with respect to an alignment frame 104. Target member 100 may be connected to frame 104 through springs 106 extending downwardly to frame 102 from transverse radial projections 108. Target member 100 is to be impacted in a manner similar to that described for target member 50, the only difference being that the construction of target member 100 sacrifices some versatility of motion in return for lower construction costs. Target member 100 may be given a lower, enlarged diameter flange portion 110 which seats positively against the under surface of guide frame 104 responsive to the restorative forces of springs 106.

The drawings depict mass 20 as impacting target member 50 vertically so as to generate primarily compressional wave energy in the earth. It is entirely feasible, however, to impact target member 50 along a path inclined to the vertical in order to generate combined compressional and shear waves. The manner in which this may be accomplished is described in detail in copending, commonly owned patent application Ser. No. 06/676,762 entitled "Mounting and Control Means For Full Waveform Seismic Source" filed Nov. 30, 1984 in the name of Tom P. Airhart. The contents of such application, on which the issue fee has been paid, is hereby incorporated by reference.

Within the scope of this invention, means other than aperture 72 may be devised by those skilled in this art in order to effect a slidable relationship between components functionally analogous to target member 50 and guide frame 52. The foregoing description should also make clear that, however configured, these two components should be relatively arranged so that each is adapted to make direct contact with the earth independent of the other responsive to sufficient extension of lift means 24. In this way, frame 52 additionally provides stability and support for the entire apparatus without dictating the lateral extent or static load bearing requirements of the target member. Furthermore, it is also possible to eliminate altogether the resilient connection between target member 50 and frame 52 as shown and described in FIGS. 3 and 5 while leaving these two components slidably coupled. In that event, alternate means (not shown) may easily be devised by those skilled in this art for picking up target member 50 when transporting apparatus 11.

It is understood therefore that the preceding description and the accompanying drawings are illustrative only of a preferred embodiment of this invention. Without departing from the scope of this invention as set forth in the appended claims, those skilled in the art will be able to make many modifications in the configuration and relative position of parts of the apparatus as described and shown.

What is claimed is:

1. An apparatus for generating a seismic wave in the earth comprising:
    (a) a mass;
    (b) means for releasably supporting the mass at a distance above the earth;
    (c) means cooperating with the means for supporting the mass for driving the mass along a downward path toward the earth;
    (d) a target of circular cross-section for receiving an impact from the mass;
    (e) a frame defining an open-ended aperture of like circular cross-section to that of the target and adapted to receive the target therein in slidable concentric relation, the frame being positionable on the earth such that the target is disposed in axial alignment with the path;
    (f) means for resiliently supporting the target from the frame within the aperture so that the target contacts the earth and so as to permit downward movement of such target against the earth responsive to the impact of the mass, thereby generating such seismic wave, the resilient means being such as to also enable the target to shift position rotationally with respect to the aperture to better follow and make firm contact with irregular ground surfaces.

2. Apparatus as claimed in claim 1 wherein the target and the aperture are cone shaped, so that when the frame is positioned on the earth, the target and the aperture are upwardly tapered, thereby enabling the target to tilt with respect to the path in conjunction with such downward movement, and to return thereafter to a position of axial alignment with the path.

3. Apparatus as claimed in claim 1 wherein the target and the aperture are cylindrical.

* * * * *